(12) United States Patent
Hall

(10) Patent No.: US 10,112,546 B1
(45) Date of Patent: Oct. 30, 2018

(54) GENERATOR STORAGE SYSTEM

(71) Applicant: Robert Hall, Bellevue, ID (US)

(72) Inventor: Robert Hall, Bellevue, ID (US)

( * ) Notice: Subject to any disclaimer, the term of this patent is extended or adjusted under 35 U.S.C. 154(b) by 0 days.

(21) Appl. No.: 15/635,328

(22) Filed: Jun. 28, 2017

(51) Int. Cl.
*B60R 9/06* (2006.01)

(52) U.S. Cl.
CPC .................................. *B60R 9/065* (2013.01)

(58) Field of Classification Search
CPC ................................. B60R 9/06; B60R 9/065
See application file for complete search history.

(56) References Cited

U.S. PATENT DOCUMENTS

| | | | |
|---|---|---|---|
| 2,898,542 A | 8/1959 | Wasko | |
| 4,103,960 A | 8/1978 | Ziese | |
| 4,556,247 A | 12/1985 | Mahaffey | |
| 4,756,457 A | 7/1988 | Polk | |
| 5,310,100 A * | 5/1994 | Liscinsky | B60R 9/065 108/44 |
| 5,586,702 A * | 12/1996 | Sadler | B60R 9/06 224/281 |
| 6,116,374 A * | 9/2000 | Westerbeke, Jr. | E04B 1/8218 181/202 |
| 6,293,451 B1 * | 9/2001 | LeMay | B60R 9/065 224/509 |
| 6,398,290 B1 | 6/2002 | Williams et al. | |
| 7,032,956 B2 | 4/2006 | Gehman et al. | |
| 7,156,273 B2 * | 1/2007 | Morris | B60R 9/06 108/14 |
| 7,514,803 B2 | 4/2009 | Wilks | |
| 7,642,665 B2 | 1/2010 | Konop et al. | |
| 8,061,571 B2 * | 11/2011 | Aghajanian | B60R 9/06 224/499 |
| D708,137 S | 7/2014 | McGee | |
| 2005/0242141 A1 * | 11/2005 | Zhang | B60R 9/06 224/499 |
| 2006/0027618 A1 * | 2/2006 | Williams | B60R 9/06 224/519 |
| 2010/0127027 A1 * | 5/2010 | Williams | B60R 9/00 224/401 |
| 2012/0292357 A1 | 11/2012 | Tennyson et al. | |
| 2013/0092714 A1 * | 4/2013 | Niemi | B60P 3/10 224/401 |
| 2013/0299529 A1 * | 11/2013 | Minning | B61D 45/00 224/29.5 |

\* cited by examiner

*Primary Examiner* — Corey Skurdal

(57) ABSTRACT

A generator storage system for securing and transporting a generator includes a vehicle that has a back side. A mount is coupled to the back side of the vehicle and a cage is coupled to the mount. A lid is hingedly coupled to the cage such that the lid selectively closes the cage. A generator is provided and the generator is positioned in the cage for transporting the generator.

6 Claims, 3 Drawing Sheets

GENERATOR STORAGE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to storage devices and more particularly pertains to a new storage device for securing and transporting a generator.

BRIEF SUMMARY OF THE INVENTION

An embodiment of the disclosure meets the needs presented above by generally comprising a vehicle that has a back side. A mount is coupled to the back side of the vehicle and a cage is coupled to the mount. A lid is hingedly coupled to the cage such that the lid selectively closes the cage. A generator is provided and the generator is positioned in the cage for transporting the generator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
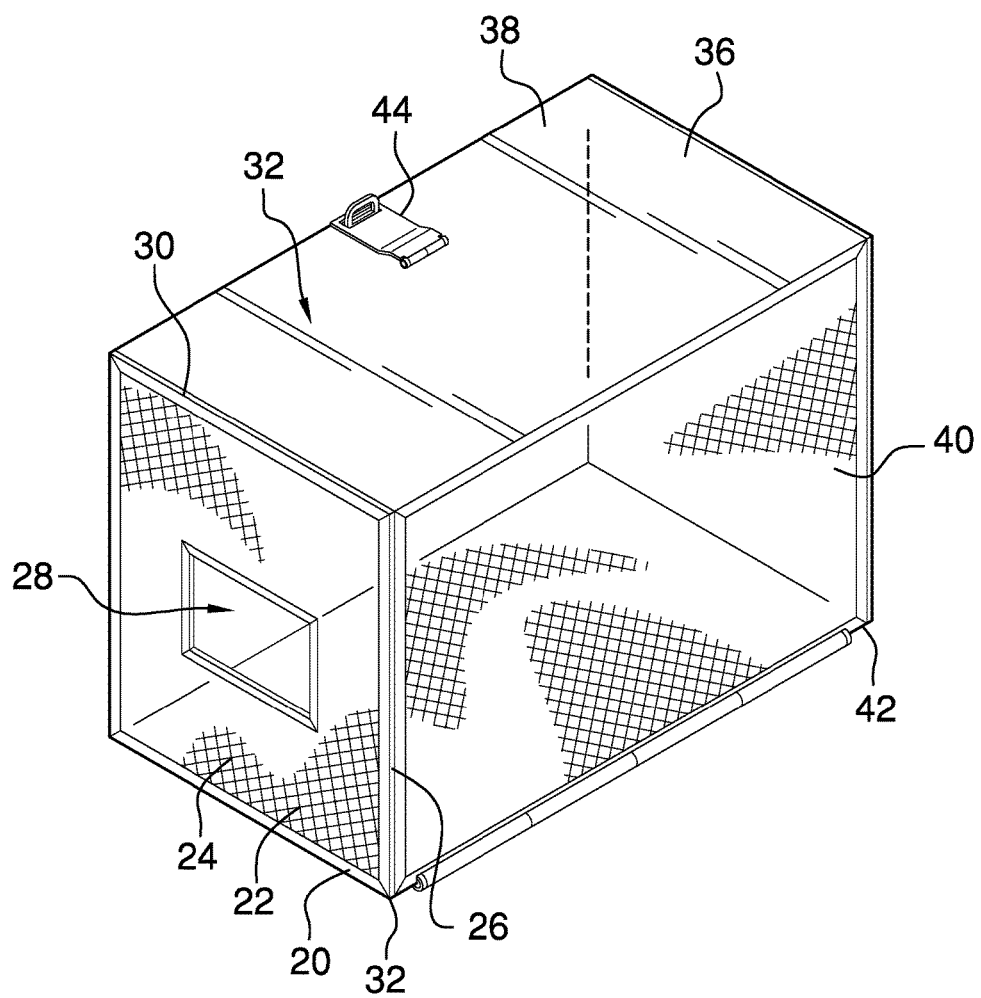
FIG. 1 is a front perspective view of cage of a generator storage system according to an embodiment of the disclosure.
Figure 2:
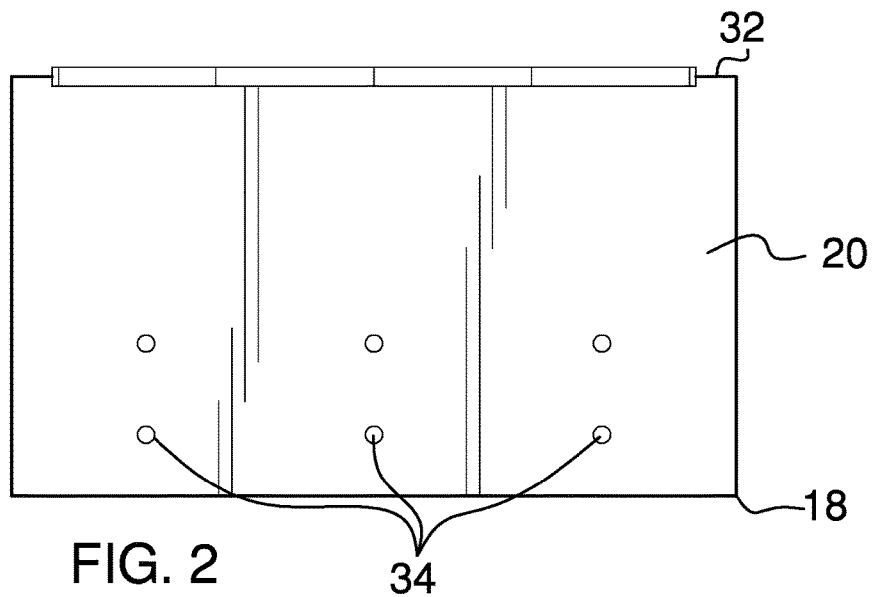
FIG. 2 is a bottom view of cage of an embodiment of the disclosure.
Figure 3:
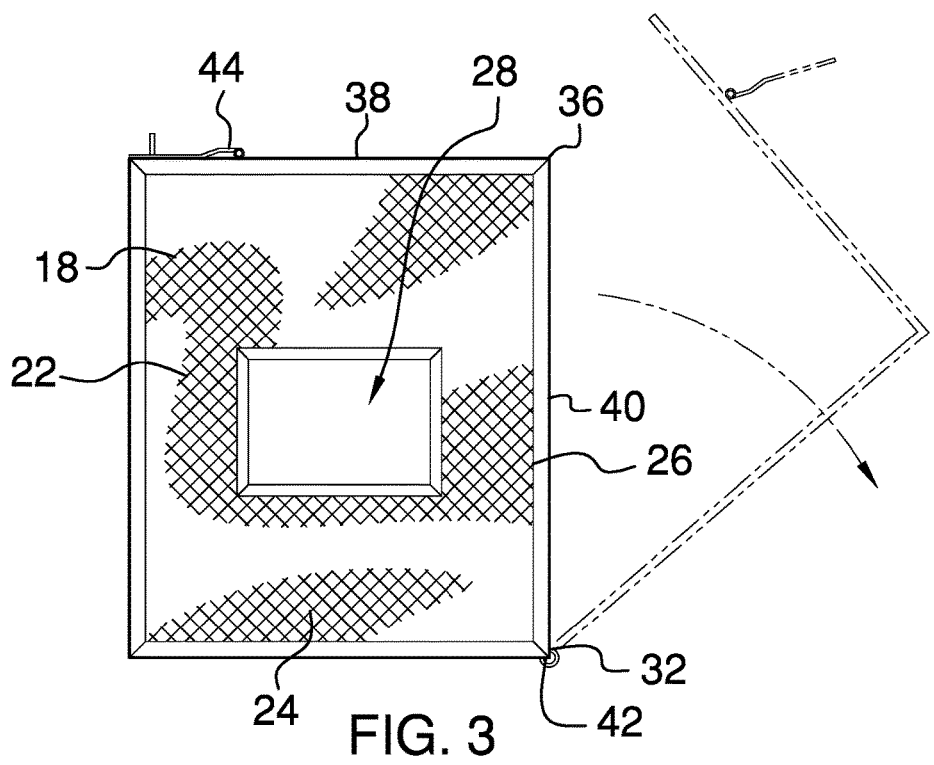
FIG. 3 is a right side view of a cage of an embodiment of the disclosure.
Figure 4:
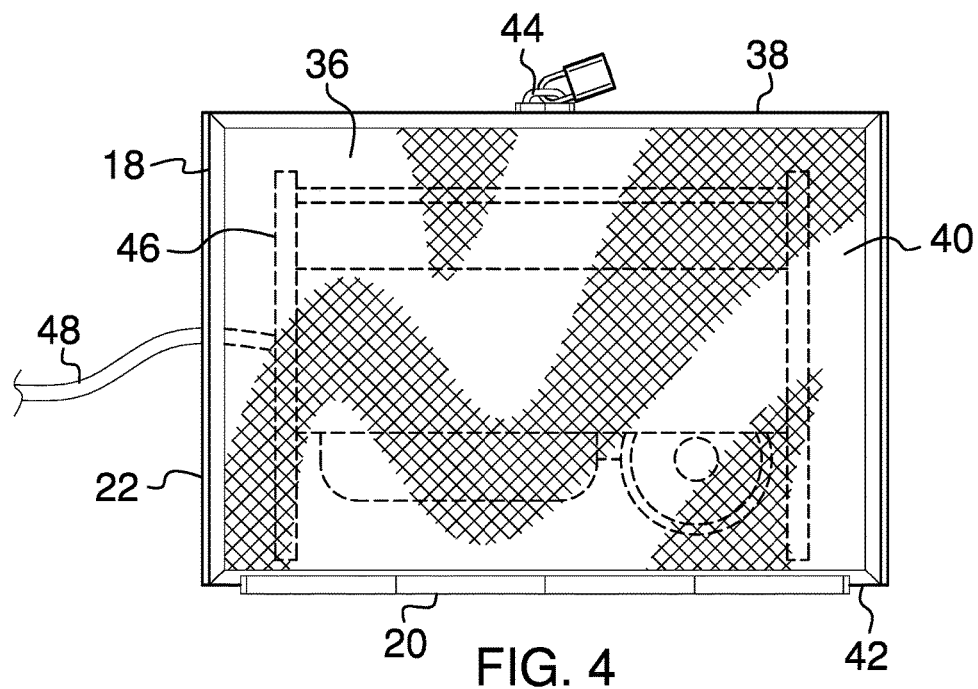
FIG. 4 is a front view of a cage and a generator of an embodiment of the disclosure.
Figure 5:
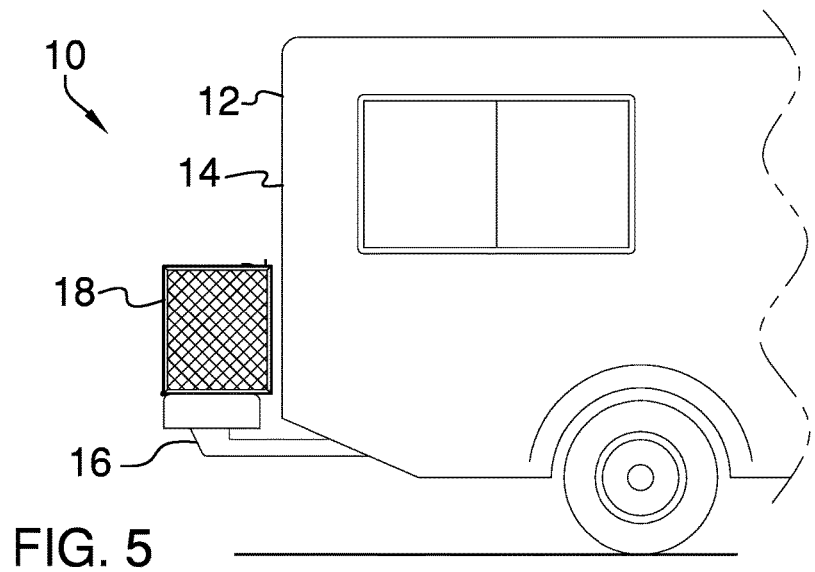
FIG. 5 is a perspective in-use view of an embodiment of the disclosure.

With reference now to the drawings, and in particular to FIGS. 1 through 5 thereof, a new storage device embodying the principles and concepts of an embodiment of the disclosure and generally designated by the reference numeral 10 will be described.

As best illustrated in FIGS. 1 through 5, the generator storage system 10 generally comprises a vehicle 12 that has a back side 14 and a mount 16 that is coupled to the back side 14 of the vehicle 12. The vehicle 12 may be a recreational vehicle, a passenger vehicle and any other vehicle 12. The mount 16 may be receiver hitch mount of any conventional design. A cage 18 is provided and the cage 18 is coupled to the mount 16 of the vehicle 12. Additionally, the cage 18 may be coupled to a trailer that is towed by the vehicle 12 and the cage 18 may be coupled directly to the back side 14 of the vehicle 12.

The cage 18 has a bottom wall 20 and a peripheral wall 22 extending upwardly therefrom. The peripheral wall 22 is comprised of a mesh material and the peripheral wall 22 has a first lateral side 24 and a front side 26. The first lateral side 24 has an aperture 28 extending into an interior of the cage 18 and the front side 26 is open into an interior of the cage 18. The peripheral wall 22 has a distal edge 30 with respect to the bottom wall 20 to define an opening 32 into the cage 18. The bottom wall 20 has a front edge 32 and the bottom wall 20 has a plurality of holes 34 extending therethrough. The holes 34 are spaced apart from each other and are distributed on the bottom wall 20. A fastener, such as a bolt or the like, is extended through each of the holes 34 to attach the cage 18 to the mount 16, the trailer or the vehicle 12.

A lid 36 is hingedly coupled to the cage 18 such that the lid 36 selectively closes the cage 18. The lid 36 has a first panel 38 that is coupled to a second panel 40 and the first panel 38 forms an angle with respect to the second panel 40. The second panel 40 has a distal edge 42 with respect to the first panel 38 and the distal edge 42 of the lid 36 is hingedly coupled to the front edge 32 of the bottom wall 20. The second panel 40 covers the front side 26 of the cage 18 and the first panel 38 covers the opening 32 in the cage 18 when the lid 36 is closed. Moreover, each of the front side 26 of the cage 18 and the opening 32 in the cage 18 is exposed when the lid 36 is opened. The first panel 38 may be comprised of a rigid material and the second panel 40 may be comprised of mesh material.

A lock 44 is coupled to the first panel 38 and the lock 44 is selectively manipulated. The lock 44 engages the cage 18 when the lid 36 is closed to retain the lid 36 is closed. The lock 44 may include a latch and a clasp and any other conventional, mechanical lock 44. A generator 46 provided and the generator 46 is positioned in the cage 18 for transporting the generator 46. The generator 46 may be a gas powered generator or the like. The generator 46 has a power cord 48 extending away therefrom and the power cord 48 is extended through the aperture 28 in the cage 18 when the generator 46 is placed in the cage 18.

In use, the cage 18 is attached to the vehicle 12 and the lid 36 is opened. The generator 46 is extended through the front side 26 of the cage 18 and is positioned on the bottom wall 20 of the cage 18. The power cord 48 is extended through the aperture 28 in the cage 18 and the lid 36 is closed. The lock 44 is manipulated to engage the cage 18 thereby retaining the lid 36 being closed. In this way the cage 18 secures the generator 46 from theft and vandalism. The cage 18 facilitates the generator 46 to be transported during camping and any other circumstance when remote electrical power is desired. Moreover, the cage 18 provides a convenient means of storing the generator 46 while the generator 46 is being used compared to positioning the generator 46 on the ground.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A generator storage system comprising:
   a vehicle having a back side;
   a mount being coupled to said back side of said vehicle;
   a cage being coupled to said mount, said cage having a front side, an opening and a bottom wall, said bottom wall having a front edge;
   a lid being hingedly coupled to said cage such that said lid selectively closes said cage, said lid having a first panel being coupled to a second panel, said first panel forming an angle with respect to said second panel, said second panel having a distal edge with respect to said first panel, said distal edge of said lid being hingedly coupled to said front edge of said bottom wall, said second panel covering said front side of said cage and said first panel covering said opening in said cage when said lid is closed, each of said front side of said cage and said opening in said cage being exposed when said lid is opened; and
   a generator being positioned in said cage for transporting said generator.

2. The system according to claim 1, wherein said cage has a bottom wall and a peripheral wall extending upwardly therefrom, said peripheral wall being comprised of a mesh material, said peripheral wall having a first lateral side and a front side, said first lateral side having an aperture extending into an interior of said cage, said front side being open into an interior of said cage, said peripheral wall having a distal edge with respect to said bottom wall to define an opening into said cage.

3. The system according to claim 2, wherein said bottom wall has a front edge, said bottom wall having a plurality of holes extending therethrough, said holes being spaced apart from each other and being distributed on said bottom wall, each of said holes being configured to have a fastener extended therethrough to attach said cage to said mount.

4. The system according to claim 2, wherein said generator has a power cord extending away therefrom, said power cord being extended through said aperture in said cage when said generator is placed in said cage.

5. The system according to claim 1, further comprising a lock being coupled to said first panel wherein said lock is configured to be manipulated, said lock engaging said cage when said lid is closed to retain said lid being closed.

6. A generator storage system comprising:
   a vehicle having a back side;
   a mount being coupled to said back side of said vehicle;
   a cage being coupled to said mount of said vehicle, said cage having a bottom wall and a peripheral wall extending upwardly therefrom, said peripheral wall being comprised of a mesh material, said peripheral wall having a first lateral side and a front side, said first lateral side having an aperture extending into an interior of said cage, said front side being open into an interior of said cage, said peripheral wall having a distal edge with respect to said bottom wall to define an opening into said cage, said bottom wall having a front edge, said bottom wall having a plurality of holes extending therethrough, said holes being spaced apart from each other and being distributed on said bottom wall, each of said holes being configured to have a fastener extended therethrough to attach said cage to said mount;
   a lid being hingedly coupled to said cage such that said lid selectively closes said cage, said lid having a first panel being coupled to a second panel, said first panel forming an angle with respect to said second panel, said second panel having a distal edge with respect to said first panel, said distal edge of said lid being hingedly coupled to said front edge of said bottom wall, said second panel covering said front side of said cage and said first panel covering said opening in said cage when said lid is closed, each of said front side of said cage and said opening in said cage being exposed when said lid is opened;
   a lock being coupled to said first panel wherein said lock is configured to be manipulated, said lock engaging said cage when said lid is closed to retain said lid being closed; and
   a generator being positioned in said cage for transporting said generator, said generator having a power cord extending away therefrom, said power cord being extended through said aperture in said cage when said generator is placed in said cage.

* * * * *